United States Patent [19]

Belart et al.

[11] 4,070,069
[45] Jan. 24, 1978

[54] PRESSURE CONTROL ARRANGEMENT FOR HYDRAULIC BRAKE SYSTEMS

[75] Inventors: Juan Belart, Walldorf; Alfred Birkenbach, Hattersheim, both of Germany

[73] Assignee: ITT Industries, Incorporated, New York, N.Y.

[21] Appl. No.: 725,896

[22] Filed: Sept. 22, 1976

[30] Foreign Application Priority Data

Oct. 3, 1975  Germany .............................. 2544172

[51] Int. Cl.² .............................................. B60T 8/04
[52] U.S. Cl. .................................................... 303/115
[58] Field of Search .................. 188/181 A; 303/113, 303/115, 117; 251/63.4

[56] References Cited
U.S. PATENT DOCUMENTS

| | | | |
|---|---|---|---|
| 3,544,171 | 12/1970 | Lester et al. | 303/117 |
| 3,666,328 | 5/1972 | Williams | 303/115 |
| 3,682,513 | 8/1972 | Oberthur | 303/117 |
| 3,702,713 | 11/1972 | Oberthur | 303/117 |
| 3,827,761 | 8/1974 | Inada | 303/115 X |

*Primary Examiner*—George E. A. Halvosa
*Attorney, Agent, or Firm*—John T. O'Halloran; Thomas M. Marshall

[57] ABSTRACT

A pressure control arrangement for hydraulic brake systems including a plunger piston which is sealingly slidable with a bore and which defines a chamber connecting with at least one brake cylinder. The chamber is connected with a brake pressure source through a valve which is kept in the open position by a connection to an auxiliary pressure source which prevents the valve from reaching or maintaining its closing position when the auxiliary pressure has failed. The auxiliary pressure is controllable for effecting an anti-skid control for which purpose the auxiliary pressure source is connected with a control chamber which is opposite the valve chamber connected to at least one wheel brake cylinder through at least one auxiliary valve.

10 Claims, 2 Drawing Figures

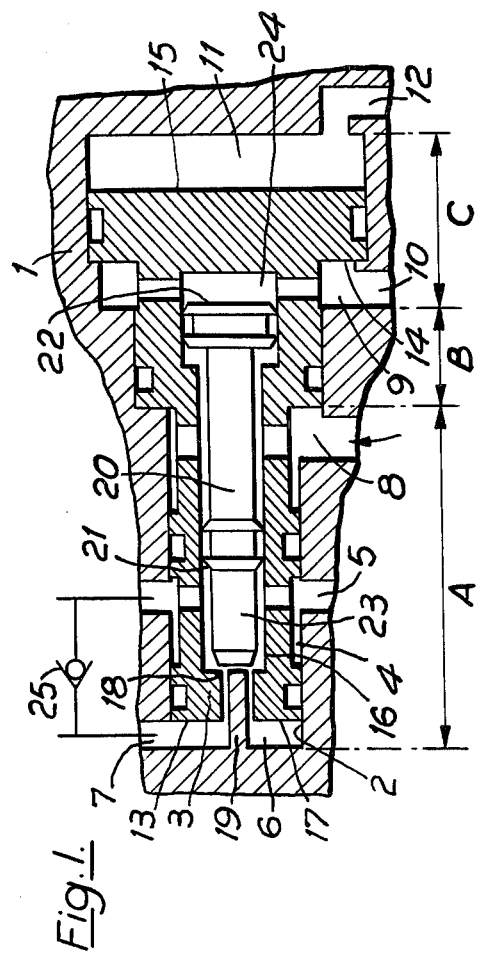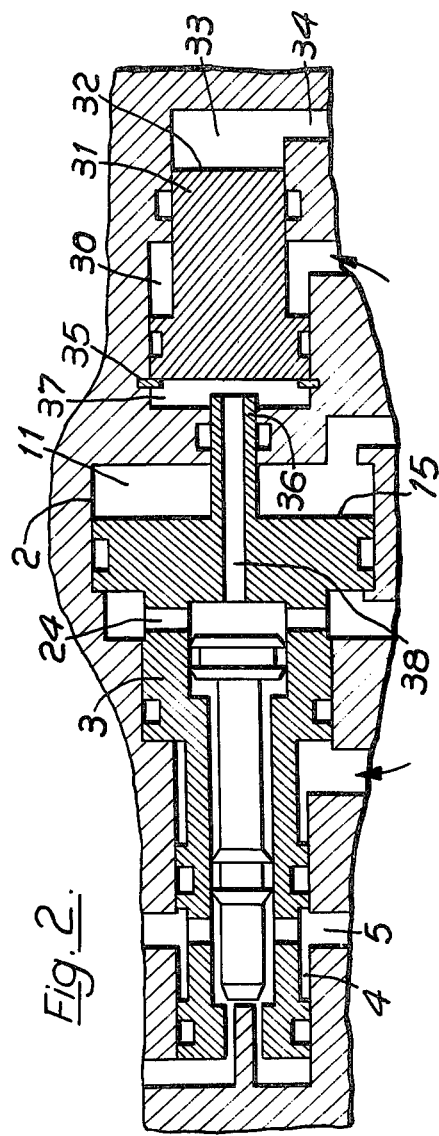

PRESSURE CONTROL ARRANGEMENT FOR HYDRAULIC BRAKE SYSTEMS

BACKGROUND OF THE INVENTION

1. Field of the Invention

Anti-skid hydraulic brake systems.

2. Prior Art

A pressure control arrangement disclosed in German unexamined and printed publication DT-OS Pat. No. 1,947,012 comprises a plunger piston which is sealingly slidable in a bore which defines a chamber connected with at least one wheel brake cylinder, the chamber being connected with the brake pressure source through a valve which is kept in the open position by a mechanical means in the end position of the plunger piston in which the chamber volume is the smallest. The plunger piston is displaceable into two end positions by pressure supplied by an auxiliary pressure source which is controllable for effecting anti-skid control, for which purpose the auxiliary pressure source is connected through at least one auxiliary valve to a control chamber lying opposite the chamber which is in communication with at least one wheel brake cylinder.

In the known pressure control arrangement a valve member of the valve is biased into the closing position by a spring and is kept open by the plunger piston through a tappet fitted thereto when the plunger piston is in its end position. When the plunger piston leaves its end position the tappet will move away from the member thereby enabling the spring to close the valve. In the event of a pressure decrease in the chamber, the differential pressure thereby occuring exerts an additional pressure on the valve member in the closing direction. The valve can be reopened only after the plunger piston has again reached its end position which thus disregards the fact that the valve performs, at the same time, the function of a check valve inhibiting the passage of fluid in the direction towards the chamber. Because of this purely mechanical valve control, care must be taken to assure that, in the event of failure of the auxiliary pressure which controls the plunger piston, the plunger piston will maintain, in any case, its end position to keep the valve open. Otherwise, the plunger piston would be moved away from its end position upon its being acted on by a slight pressure supplied to the wheel brake cylinders. The valve will be closed thereby and no further brake pressure could be built up. Accordingly, the known pressure control arrangement provides for another auxiliary power source in the form of an emergency spring which is kept in a standby position by the auxiliary pressure for so long as it is available. If the auxiliary pressure fails, the spring will relax keeping the plunger piston in its end position. In this known arrangement the emergency spring must still have a biasing force sufficiently high to enable the plunger piston to maintain its end position in opposition to the maximum possible brake pressure.

It is a serious drawback of this known pressure control arrangement that generally an outside power source has to be provided to assure normal braking without any skid control in those cases where the auxiliary pressure has failed. This results in a device which is large in size, heavier and increased cost for a pressure control arrangement. In addition, the positioning of such a strong prestressed emergency spring causes considerable difficulties. These drawbacks have particular weight because the emergency spring is required only for rarely occurring events as an additional safety measure just to keep the valve open. The fact that it prevents at the same time an increase of the chamber volume in the event of a failure of the auxiliary pressure, which means no pressure fluid is drawn from the brake system is rather irrelevant for a larger number of brake systems since a limited increase of the chamber volume can be handled without difficulty.

An example of the known braking system described above is set forth in German Pat. No. 909,657. In German Pat. No. 909,657 the plunger piston is completely mechanically separated from the valve. The plunger piston is controlled by the auxiliary pressure purely by hydraulic means, with the provision of additional means for keeping it in the end position upon failure of the auxiliary pressure. If the auxiliary pressure fails it will thus be displaced into a position enlarging the chamber volume. The valve will be switched mechanically independent of the plunger piston's position. To prevent the cost of such a device from becoming too high, it is further provided with means to switch the valve together with an auxiliary valve controlling the auxiliary pressure for the anti-skid control by means of a solenoid. In this device the auxiliary valve has the same function as the auxiliary valve described in the pressure control arrangement set forth in DT-OS Pat. No. 1,947,012 which function is to disconnect a control chamber from the outside pressure source and connect it with the return line in order to achieve a decrease in brake pressure. To increase the brake pressure again the control chamber is reconnected with the outside pressure source so that the pressure increases therein and the plunger piston is urged back into its end position.

In the brake system according to German Pat. No. 909,657 the valve opens completely independent of the position of the plunger piston and the brake pressure prevailing in the chamber. Thus there will be no approximation between the effective brake pressure and the pressure of the brake pressure source. To the contrary the valve will reopen just when the brake pressure in the chamber is at its lowest value within the control cycle because it is at this moment that the auxiliary valve has to change its position to urge the plunger position back into its end position. Due to the valve opening at that moment, pressure fluid from the brake pressure source will substantially flow into the chamber which leads to a substantial yielding of the brake pedal. Also the brake pedal will be increased to the pressure level of the brake pedal source before the plunger piston reaches its end position. If the wheel concerned does not become locked again, thereby the plunger piston will continue moving into its end position out of the chamber again thereby causing the brake pedal to be raised again to the opposition of the force being exerted by the driver. In most cases, however, the wheel will lock again due to the sudden increase of pressure so that another control cycle will follow in which the plunger piston starts to leave its middle position. The distance within which the plunger piston is allowed to move must be closely restricted in order to prevent the situation in which the chamber draws too much pressure fluid in the case of failure of the auxiliary pressure which would entail the risk of exhausting the brake pressure source. As a consequence, a movement of the plunger piston away from its middle position to avoid wheel lock is not sufficient. It will be apparent from the above that the mechanical control of the valve depending upon the plunger piston is necessary in a pressure control arrangement of the type initially referred to in order to ensure a satisfactory anti-skid control.

In German Pat. No. 2,130,100 a pressure control arrangement has already become known which comprises substantially a floating piston inserted in the brake line. In the arrangement of this patent, one piston end is exposed to the pressure in the brake pressure source which causes displacement of the piston and generation of the brake pressure acting on the wheel brake cylinder on the other piston end. To achieve an anti-skid control, the auxiliary pressure controlled by auxiliary valves, is supplied to an additional annular surface of the piston acting against the pressure from the brake pressure source which causes the piston to move. While it is true that this pressure control arrangement has the advantage that failure of the auxiliary pressure merely causes the anti-skid control to become ineffective and does not effect the brake system, it is, however, a disadvantage in that any control cycle, no matter how small the decrease in brake pressure it causes is, results in pressure fluid being urged back to the brake pressure source which immediately makes itself felt at the brake pedal in the case where static brake pressure sources are used. In contrast thereto it should be the aim of all anti-skid control systems to achieve, in a normal control cycle, during which only a minor pressure decrease is necessary, no pressure fluid can be urged back. In a strong control cycle effecting substantial pressure changes which usually occurs only during variations of the coefficient of friction, a small amount of pressure fluid which is urged back to the brake pressure source could be withstood without difficulty. In this case, when using a static brake pressure source, a normal control cycle would not make itself felt at all and a strong control cycle could be felt only slightly. Such an operating characteristic would no doubt constitute an advantageous side effect in a pressure control arrangement. However, of primary importance are the disadvantages inherent in the known pressure control arrangements.

The device of this invention is therefore based on the pressure control arrangement described in DT-OS 1,947,012 since that arrangement, apart from the disadvantages described, provides an advantage in that its control cycle does not effect the control brake pressure source.

SUMMARY OF THE INVENTION

It is the object of this invention to avoid the disadvantages of the known pressure control arrangement, without incurring the disadvantages inherent in the other pressure control arrangements described.

Therefore, it is an object of this invention to provide a pressure control arrangement of the type initially referred to which operates in a manner so that the valve is opened in the event of a failure of the auxiliary pressure independent of the position of the plunger piston.

These and other objects are accomplished according to the device of this invention by providing a piston which is included with a closure member of the valve and which has a first end acted on from the pressure of the brake pressure source in the opening direction and a second end acted on by the auxiliary pressure in the closing direction with the acted on ends being dimensioned so that the closure member is always preloaded in the closing direction when the auxiliary pressure is available. Due to the fact that the valve can reach its closing position only by means of the auxiliary pressure with the brake pressure always attempting to push the valve open it is impossible for the valve to reach or maintain its closing position when the auxiliary pressure has failed. Thus the necessity for mechanical means to keep the plunger piston in its end position to keep the valve open mechanically is thereby positively obviated.

In an advantageous embodiment of this invention, the closure member is designed as a coaxial projection of the piston, with the piston being disposed in an axial bore of the plunger piston and the bore being designed in the direction towards the chamber as a valve passageway adapted to be closed by the closure member, with a tappet adapted to be supported on the chamber bottom projecting into the passageway. The pressure from the brake pressure source is fed between the valve passageway and a first acted on end of the piston into the bore. A chamber defined by the second acted on piston end and the bore bottom is directly connected with the auxiliary pressure source. The resulting structure is extremely compact which permits a slight separation of media using but one vent. All seals are moved in each cycle so that they cannot stick and become damaged eventually if an exceptional situation occurs.

In the device of this invention, means are also provided, disposed between the chamber and the brake pressure source, which constitute a check valve inhibiting flow in the direction towards the chamber. This makes allowance for the possible heating up of the pressure fluid in the wheel brake cylinders by ensuring that the brake pressure is never allowed to exceed the pressure of the brake pressure source.

In one embodiment of this invention, the plunger piston is defined as a stepped piston, the cross-section of the portion facing the control chamber being greater than the cross section facing the chamber by an amount corresponding at least to the size of the second acted on piston end, thus providing for means wherein the piston of the valve is also defined as a stepped piston, with the ratio between the second acted on piston end and the first acted on piston end corresponding at least to the ratio between the maximum possible brake pressure and the auxiliary pressure and wherein the ratio between the plunger piston cross section facing the control chamber, less the opposite cross-section in the chamber and the cross-section facing the chamber corresponds at least to the ratio between the second and first acted on ends of the piston.

In this embodiment a auxiliary pressure may be used which is less than the maximum braking pressure. In many vehicles the power steering pump, for example, which is available anyway, serves the purpose of an outside pressure source thus obviating the need for an additional outside pressure source especially for the anti-skid control. The result is a substantially less expensive anti-skid control system. Furthermore, it is further provided that the plunger piston have a second step for limiting an annular chamber connecting with the chamber, the annular surface thereof being exposed to the auxiliary pressure in the direction of the control chamber and the plunger piston having a coaxial projection extending away from the chamber which is sealingly axially slidable in a cylindrical bore receiving a sealingly slidable reaction piston which is exposed to the pressure from the brake pressure source acting toward the chamber which prevents it, at a preset distance from a projection, from moving towards the projection by means of a stop rigid with the housing. The preset distance is chosen so as to enable the plunger piston to perform a movement corresponding to a normal control cycle before the projection comes into abutment with the reaction piston. This arrangement allows for a normal control cycle to have no effect on the brake pressure source on the one hand and on the other hand the plunger piston will move no more than is required for a normal control cycle if the auxiliary pressure has failed. Nevertheless, with auxiliary pressure available, it is possible to achieve further displacement with the plunger piston for a strong control cycle whereby a small amount of pressure fluid will be urged back to the brake pressure source by the reaction piston.

Preferably, there is provided a pressure control arrangement for a brake system which includes a brake pressure source wherein there is a controlled delivery of auxiliary pressure in proportion to an actuating force, with the auxiliary pressure being adapted to actuate a static master cylinder wherein a pressure fluid connection is provided between the chamber and that section of the cylinder bore which faces the projection and is limited by the reaction piston. In such an embodiment the reaction piston is at least partly relieved so that the forces to be exerted for its displacement in a strong control cycle are irrelevant even at high braking pressures.

Further objects and advantages will become apparent from the following description explaining two embodiments illustrated in greater detail in the drawings.

BRIEF DESCRIPTION OF THE DRAWINGS

FIG. 1 shows an embodiment providing an auxiliary pressure source having a pressure level which is below the maximum braking pressure; and FIG. 2 shows an embodiment including a reaction piston for a brake system in which the auxiliary pressure is controlled proportionally to the braking pressure.

DESCRIPTION OF THE PREFERRED EMBODIMENT

Referring to FIG. 1 the device disclosed includes a housing 1, which includes a stepped bore 2, the bore 2 being subdivided into sections A, B and C. Section A includes two sealing points defined by an annular groove 4 of the plunger piston 3. Annular groove 4 is in communication with a brake pressure source (not shown) through port 5. The brake pressure source may be, for example, a conventional master cylinder or the like. The lefthand end of plunger 3 defines, in section A, a chamber 6 which connects with the wheel brake cylinders (not shown) through a port 7. Between a step of sections A and B, a compensating chamber 8 is formed which is always unpressurized and connects with the atmosphere. An annular chamber 9 is provided by a step between sections B and C and is defined by the sealing points of plunger piston 3 at sections B and C, which is in permanent communication with an auxiliary pressure source (not shown) through a port 10. The righthand end of plunger piston 3 defines, in section C, a control chamber 11 which is connected with the auxiliary pressure source or an unpressurized reservoir through a port 12 via an auxiliary valve (not shown). In an intermediate position of the auxiliary valve control chamber, 11 may also be fluid tight.

Thus the plunger piston 3 has its left end 13 acted on by the braking pressure supplied to the brake wheel cylinder which causes the piston 3 to be urged to the right. Further it has the annular surface 14 defining annular chamber 9 which is always exposed to the auxiliary pressure fully available and likewise causes plunger piston 3 to be urged to the right. For the purpose of defining control chamber 11, plunger piston 3 has its other end 15 upon which the auxiliary pressure acts to the left to the degree determined by the auxiliary valve (not shown). As long as no control cycle takes place, control chamber 11 is fully pressurized to the auxiliary pressure available. Surfaces 13, 14, 15 are so dimensioned that as long as the full auxiliary pressure prevails in control chamber 11, plunger piston 3 is always held in its left end position in which the chamber 6 has its smallest volume. With the auxiliary pressure diminishing in control chamber 11, plunger piston 3 will be displaced to the right thereby increasing the volume of chamber 6. The amount of travel of displacement of plunger piston 3 is dependent upon the degree of reduction of the auxiliary pressure in the control chamber and on the reaching of a correspondingly reduced brake pressure in chamber 6.

Plunger piston 3 has a coaxial bore 16 connecting at the left end with chamber 6 through a valve passageway 17. A valve seat 18 is formed between bore 16 and valve passageway 17. The lefthand end of bore 16 connects with annular groove 4. The righthand end of bore 16, which is stepped, has a diameter larger than that of the lefthand portion disposed in section A, with the righthand portion connecting with the annular chamber 9. The two ends of bore 16 are separated from one another by a piston 20 which is provided with one sealing point in each of the lefthand and righthand portions. A space between the sealing points is connected to compensating chamber 8. Piston 20 has a first acted on end 21 facing the valve passageway 17, said end being exposed to the pressure from the brake pressure source. Piston 20 also has a second acted on end 22 facing the righthand end of bore 16 said end 22 always being exposed to the full auxiliary pressure. In the arrangement illustrated the piston ends acted on are dimensioned in such a way that the piston 20 is always biased to the left when auxiliary pressure is available.

Piston 20 has a projection 23 extending from the first acted on end 21 which forms a closure member 23 cooperating with the valve seat 18. When piston 20 is displaced to the left, closure member 23 will move into engagement with the valve passageway 18 thereby closing passageway 17, whereas valve passage 17 will be opened during the displacement of piston 20 to the right. A tappet 19 rigid with the housing 1 extends into the valve passageway 17 and projects, in the lefthand end position of plunger piston 3 into the bore 16 past valve seat 18 thereby mechanically keeping closure member 23 off valve seat 18. Thus closure member 23 can reach its closing position only if the plunger piston 3 has left its lefthand end position. Between chamber 6 and an annular chamber 4 a check valve 25 is provided which inhibits flow in the direction towards the chamber 6, said valve 25 being indicated in FIG. 1 schematically. Valve 25 prevents the pressure in chamber 6 from ever becoming higher than the pressure in annular chamber 4.

The mode of operation of the device illustrated in FIG. 1 is as follows:

Before any braking action takes place the full auxiliary pressure is effective in control chamber 11, annular chamber 9 and chamber 24. The plunger piston 3 is to be biased into its lefthand end position. Piston 20 is likewise biased towards the left and is supported on tappet 19 and correspondingly to housing 1. The valve passageway 17 therefore remains open despite the bias of piston 20.

During normal braking there is thus free passage of fluid under pressure between the ports 5 and 7 so that the pressure from the brake pressure source is fed directly to the wheel brake cylinder. In this situation the pressure acting on the first acted on end 21 of piston 20 is not in a position to overcome the biasing force, the force resulting from the auxiliary pressure acting on the second acted on end 22 in order to displace the piston 20 to the right. Neither is the pressure acted on end 13 of plunger piston 3 in a position to shift plunger piston 3 to the right, in opposition to the full auxiliary pressure acting on its end 15. Consequently, all parts remain in the position illustrated in FIG. 1.

Only when there is the occurrence of a locked wheel condition is the auxiliary pressure in control chamber 11 reduced by the auxiliary valve at which time the plunger piston 3 starts moving to the right. This will cause tappet 19 in valve passageway 17 to move as far as behind valve seat 18 so that valve member 23 closes the valve passageway 17 at valve seat 18 because the piston is allowed to move relative to the plunger piston 3 owing to the displacement of plunger piston 3. As soon as valve member 23 has moved into engagement with valve seat 18 the biasing force of piston 20 will urge the plunger piston 3 to the left through valve seat 18.

Thereupon plunger piston 3 will first remain in this position until further suitable pressure decrease has taken place in the control chamber 11 so that the plunger piston 3 is again put into a position to move further to the right. However, since the chamber 6 is then disconnected from the brake pressure source and increases its volume there will result a corresponding decrease in the effective brake pressure. Plunger piston 3 will move to the right until a state of equalibrium is achieved between the pressure of chamber 6 and the other forces acting on plunger piston 3. The decrease of the effective brake pressure is therefore always in a preset relationship to the reduction of the auxiliary pressure in control chamber 11. It should be noted in this connection that, due to the second acted on end 22 of piston 20 and the support of piston 20 through valve seat 18, a certain pressure decrease is present in control chamber 11 during which the plunger piston 3 does not move, with, however, the valve passageway 17 being closed. It will be understood that this intermediate position of plunger piston 3 is not conditioned upon a certain point within the pressure variation of the auxiliary pressure prevailing in control chamber 11. The intermediate position can therefore be reached in a particularly simple manner by reducing the auxiliary pressure in chamber 11 to any arbitrary value within its range.

However, if the auxiliary pressure fails the pressure from the brake pressure source will act to the right only on end 13 of the plunger piston and on the first end 21 of piston 20. Thus, omitting frictional forces there are no counterforces present. Therefore both the plunger piston 3 and piston 20 are shifted to their extreme righthand positions. Closure member 23 is therefore prevented from moving into engagement with valve seat 18 so that the pressure fluid communication between ports 5 and 7 is not interrupted. This ensures, even when the auxiliary pressure has failed, that normal braking can still be effected.

Referring now to the embodiment of FIG. 2, the portions as it relate to the plunger piston 3 are identical to the embodiment illustrated in FIG. 1 so that further explanation of those portions is unnecessary. To the extent that an explanation is desirable with respect to the description of the function, the same reference numerals utilized in FIG. 1 have been referenced in FIG. 2. Additional elements are illustrated in FIG. 2, including a cylindrical bore 30 which is coaxial with a stepped bore 2 and receives, in a sealed sliding relationship, a reaction piston 31. Along with its righthand reaction face 32, reaction piston 31 defines a reaction chamber 33. Reaction chamber 33 communicates with the brake pressure source, or port 5, through a port 34. Thus, during any braking operation reaction chamber 33 is always pressurized to the same pressure exerted by the operator's pedal force as is likewise supplied to annular chamber 4. By virtue of this pressure, reaction piston 31 is acted on to the left coming to rest on a stop 35 which is rigid with the housing 1. A projection 36 extends from the end 15 of plunger piston 3 to the right into reaction chamber 37 on the lefthand side of reaction piston 31. By this means, the projection 36 is passed through an opening between control chamber 11 and the reaction chamber 37. Projection 36 is in a sealed slidable relationship with the opening. If all of the parts are in their inactive positions, in other words, if plunger piston 3 and reaction piston 31 are in their lefthand positions, the end of projection 36 is at a predetermined distance from reaction piston 31. The distance is adjusted so that the plunger piston 3 is allowed to move to the right as far as is necessary for a normal control cycle. Following such movement of the plunger piston 3 to the right, projection 36 comes into abutment with reaction piston 31 so that further movement of the plunger piston 3 to the right can only be achieved in conjunction with a movement of reaction piston 31.

The elements described so far with reference to FIG. 2 permit two different variations of the embodiment illustrated. In the first variant, a pressure fluid connection 38 represented in FIG. 2 is disposed in projection 36 and provided for a communication between the chamber 24 and the reaction chamber 37. Reaction chamber 37 is closed as illustrated. A second variant would not provide for fluid pressure connection 38 so that chamber 24 and reaction chamber 37 are separated from one another. In this case the reaction chamber 37 is unpressurized and is connected to the atmosphere.

In the following description first there is described the function of the second variation which has no pressure fluid connection 38 and which the reaction chamber 37 communicates with the atmosphere. In normal control cycles, during which the projection 36 does not move into abutment with reaction piston 31, the mode of operation of this variant is identical to that of the embodiment of FIG. 1. However, if a strong control cycle occurs, during which the movement of projection 36 brings it into abutment with the reaction piston which is not sufficient, the plunger piston 3 will, in a first stage, be kept in this position through reaction piston 31 by virtue of the pressure from the brake pressure source which prevails in reaction chamber 33. After overcoming a range of pressure decrease similar to that occuring on the second acted end of piston 20, the force present in annular chamber 9 and in front of end 13 of plunger piston 3 will be sufficient to displace plunger piston 3 together with reaction piston 31 further to the right in opposition to the effect of the pressure to the brake fluid source thereby reducing the pressure in chamber 6. In this process pressure fluid will be urged out of reaction chamber 33 back to the brake pressure source. By virtue of the fact that again a certain pressure range has to be exceeded in the pressure course of control chamber 11 between the abutment of projection 36 against reaction piston 31 and a further displacement of the plunger piston 3 to the right, this method affords again a particularly simple possibility for approaching that position of plunger piston 3, and it will suffice to select any arbitrary pressure within the pressure control range of chamber 11. If in this variant the auxiliary pressure fails, plunger piston 3 and piston 20 will first be shifted as described with reference to FIG. 1, however, only until projection 36 comes into abutment with the reaction piston 31. In no instance will the valve passageway 17 be closed thereby. As soon as projection 36 is in an abutting relation with piston 31, plunger piston 3 and reaction piston 31 will take support upon each other and will be pressure balanced since chamber 6 and reaction chamber 33 will be pressurized to the same value as determined by the brake pressure source. The entire arrangement will draw no further pressure fluid from the brake pressure source without regard to whether it remains in this position or is displaced further by any impacts whatsoever.

Now referring to the first variant of the device illustrated in FIG. 2 which provides for a pressure fluid connection 38 and also for fluid tight closing of reaction chamber 37, there results the following mode of operation.

It should be understood, however, that this first variation is only suitable for use in a brake pressure system having a brake pressure source in which an auxiliary pressure is supplied which is proportional to actuating forces with the auxiliary pressure being adapted to actuate a static master cylinder. In this variant the auxiliary pressure controlled by brake pressure source is also used for control plunger piston 3 and reaction piston 31. In other words, only during a braking operation will auxiliary pressure being available in control chamber 11, annular chamber 9, chamber 24 and reaction chamber 37. The auxiliary pressure being proportional to the pressure made available by the brake pressure source of the braking operation. For an anti-skid control the auxiliary pressure in chamber 11 is modulated by an auxiliary valve (not shown) in the same manner as described in connection with the functions of the embodiment illustrated in FIG. 1 and the second variant of this embodiment illustrated in FIG. 2. Since the pressure effective in reaction chamber 37 is always the full auxiliary pressure provided by the brake pressure source, reaction piston 31 is pressure balanced since its reaction face 32 is exposed to the brake pressure made available by the brake pressure source and acting in opposition thereto, this pressure being proportional to the auxiliary pressure. To achieve this, reaction piston 31 is designed as a stepped piston as shown in FIG. 2 depending upon the relationship between the auxiliary pressure and available brake pressure. In this variant reaction piston 31 offers no resistance to plunger piston 3 when the auxiliary pressure is available so that it is permitted to move freely even when projection 36 is in abutment with reaction piston 31. The auxiliary pressure to which the plunger piston 3 is exposed is rated in such a way that the plunger piston remains in its lefthand end position against the force resulting from the pressure in chamber 6 as long as no control cycle takes place. When a control cycle commences plunger piston 3 will start moving to the right when a slight pressure decrease occurs in control chamber 11 and even though the brake pressure level is still low since in this case also the level of the auxiliary pressure is correspondingly low. Thus, with a control cycle commencing and the brake pressure level being low, it is not necessary to achieve first a substantial pressure decrease in control chamber 11 in order to displace plunger piston 3.

It is to be understood that the function is identical with a second variant of the embodiment of FIG. 2 it being also true in the event of failure of auxiliary pressure. In such a case such brake systems provide for variation of brake pressure between pressure source also without assistance of auxiliary pressure by means of an emergency actuation.

While various embodiments of this invention have been illustrated and/or described, it will be appreciated by those of skill in this art that changes may be made which do not depart from the scope of the appended claims.

What is claimed is:

1. A pressure control arrangement for hydraulic brake systems comprising a plunger piston in a sealed slidable relationship in a bore which defines a first chamber connecting with at least one wheel brake cylinder, said first chamber being connected with a brake pressure source through a first valve which is kept in the open position by a mechanical means when said plunger piston is in its end position wherein the volume of said first chamber is its smallest, said plunger piston being displaceable into said end position by pressure supplied by an auxiliary pressure source, said auxiliary pressure being controllable for affecting anti-skid control for which purpose the auxiliary pressure source is connected with a control chamber lying opposite said first chamber through at least one auxiliary valve, a control piston positioned in an axial bore in said plunger piston joined to a closure member of said first valve having a first end acted on by the pressure from said brake pressure source in the opening direction and a second end acted on by the auxiliary pressure in the closing direction, said acted on ends being dimensioned so that said closure member is always preloaded in the closing direction when auxiliary pressure is available.

2. The brake pressure control arrangement as set forth in claim 1 wherein said closure member comprises a coaxial projection on said control piston, said axial bore being arranged in the direction towards said first chamber as a valve passageway adapted to be closed by said closure member with a tappet means adapted to be supported on the bottom of said first chamber projecting into said passageway including means wherein pressure from said brake pressure source communicates between said valve passageway and said first acted on end of said control piston in said bore and wherein said control chamber defined by said second acted on end of said control piston and the bottom of said bore are directly connected with said auxiliary pressure source.

3. The pressure control arrangement as set forth in claim 2 further including a check valve which inhibits flow in the direction towards said first chamber, said check valve being disposed between said first chamber and said brake pressure source.

4. The pressure control arrangement as set forth in claim 2 wherein said plunger piston is a stepped piston, the cross section thereof facing said control chamber being greater than the cross section facing said first chamber by an amount corresponding at least to the size of said second acted on end of said control piston.

5. The pressure control arrangement as set forth in claim 2 wherein said plunger piston and control piston of said valve are designed as stepped pistons having the ratio between the second acted on end and the first acted on end of said control piston corresponding at least to the ratio between the maximum possible brake pressure and the auxiliary pressure and wherein the ratio between the cross section of said plunger piston facing said control chamber less the opposite cross section in said chamber corresponding to said second applied end of said control piston and the cross section of said plunger piston facing said first chamber corresponding at least to the ratio between said second and first acted on ends of said control piston.

6. The pressure control arrangement as set forth in claim 5 wherein said plunger piston has a second step for limiting an annular chamber connecting with said first chamber, the annular surface thereof being exposed to the auxiliary pressure acting in the direction of said control chamber.

7. A pressure control arrangement as set forth in claim 6 wherein said plunger piston has a coaxial projection extending away from said first chamber and being in a sealed axial sliding relationship in a cylinder bore received in a sealed and slidable arrangement, a reaction piston which is exposed to the pressure from said brake pressure source acting towards said first chamber and which is limited, at a preset distance from said projection, from moving towards said projection by means of a stop rigidly fixed in the housing, said distance being chosen so as to enable said plunger piston to perform a movement corresponding to a normal control cycle before said projection comes into abutment with said reaction piston.

8. A pressure control arrangement as set forth in claim 7 in a brake system includling a brake pressure source wherein there is a controlled delivery of auxiliary pressure in proportion to an actuating force and wherein said auxiliary pressure is attached to actuate a static master cylinder wherein a pressure fluid connection is provided between said first chamber and a reaction chamber which faces said projection and is limited by said reaction piston.

9. The pressure control arrangement as set forth in claim 8 wherein said pressure fluid connection extends through said projection.

10. The pressure control arrangement as set forth in claim 8 wherein said reaction piston is a stepped piston with the ratio between its end facing said projection and the reaction face exposed to said brake pressure is equal to or smaller than the ratio between said brake pressure and said auxiliary pressure.

* * * * *